United States Patent [19]
Aagard

[11] 3,731,290
[45] May 1, 1973

[54] OPTICAL MASS MEMORY

[75] Inventor: Roger L. Aagard, Minneapolis, Minn.

[73] Assignee: Honeywell Inc., Minneapolis, Minn.

[22] Filed: July 15, 1971

[21] Appl. No.: 162,919

[52] U.S. Cl. ....................340/174 YC, 340/174 DA, 340/174 TF, 340/174 GA, 340/174.1 M, 346/74 MT

[51] Int. Cl. ....G11c 11/14, G11c 11/42, G01d 15/12

[58] Field of Search..................340/174 TF, 174 YC, 340/173 LM, 174.1 M, 174. 1 B; 346/74 M, 74 MT

[56] References Cited

UNITED STATES PATENTS

| | | | |
|---|---|---|---|
| 3,500,361 | 3/1970 | Cushner | 340/174.1 M |
| 3,657,707 | 4/1972 | McFarland et al. | 340/173 LM |

*Primary Examiner*—James W. Moffitt
*Attorney*—Lamont B. Koontz et al.

[57] ABSTRACT

An optical mass memory of the Curie point writing type includes a system for instantaneously checking written bits to ensure that the magnetization direction of the bit was properly stored.

6 Claims, 4 Drawing Figures

INVENTOR.
ROGER L. AAGARD
BY Osmund R. Dahle
ATTORNEY.

*INVENTOR.*
ROGER L. AAGARD
BY Osmund R. Dahle
ATTORNEY.

OPTICAL MASS MEMORY

BACKGROUND OF THE INVENTION

The present invention is directed to an optical mass memory and in particular to a memory in which information is stored on a ferromagnetic medium by Curie point writing.

A highly advantageous optical information storage scheme utilizes a laser to provide Curie point writing on a ferromagnetic medium. Such a scheme was disclosed and claimed in U. S. Pat. No. 3,368,209 to L. D. McGlauchlin et al. and is assigned to the same assignee as the present invention.

Ordinarily, optical mass memories utilizing Curie point writing make use of a thin ferromagnetic film such as manganese bismuth (MnBi) as the ferromagnetic medium. One difficulty which is encountered in utilizing thin magnetic films is that it becomes very difficult to prepare large areas of magnetic film which are completely free of flaws which are at least as large as the desired bit size. These flaws may be due, for example, to pin holes in the film or may be caused by small imperfections in the substrate upon which the magnetic film is deposited. If a bit is recorded in a region of the film containing a flaw, the bit may be erroneously recorded or not recorded at all and an erroneous output signal will be derived from that bit during readout.

SUMMARY OF THE INVENTION

By utilizing the method of the present invention, it is possible to check a written bit immediately after writing to ensure that the information in the form of a magnetization direction is properly stored.

During the writing operation, a light beam is directed to a region of the ferromagnetic medium. The light beam has an intensity sufficient to heat the region above the Curie temperature. The light beam is then attenuated to an intensity insufficient to heat the region above the Curie temperature, such that the region cools to a temperature below the Curie temperature and has a magnetization direction determined by a net magnetic field present at the location of the region. Checking to ensure that the proper magnetization direction was stored in the region is accomplished by immediately monitoring the magneto-optic rotation caused by the region so as to produce a magneto-optic signal indicative of the magnetization direction of the region as the region cools to a temperature at which it has substantially recovered its magnetization.

DESCRIPTION OF THE PREFERRED EMBODIMENTS

Figure 1:
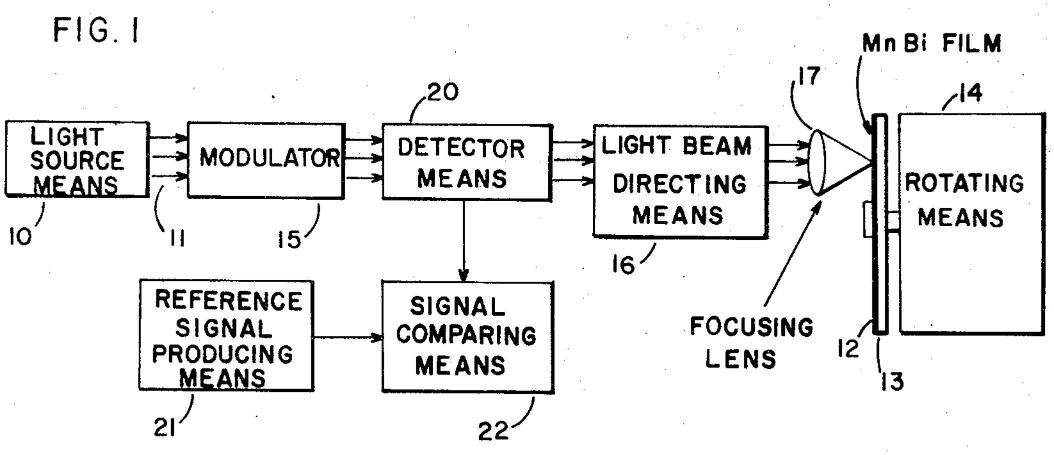
FIG. 1 shows an optical mass memory of the Curie point type including a system for immediately checking written bits.

In FIG. 1 is shown an optical mass memory utilizing Curie point writing. Light source means 10 provides a light beam 11 having an intensity sufficient to heat a region of ferromagnetic memory medium 12 above the Curie temperature. In a preferred embodiment ferromagnetic medium 12 is a manganese bismuth film. As shown in FIG. 1, ferromagnetic medium 12 is positioned on disk 13 which is rotated by rotating means 14. Alternatively, ferromagnetic medium 12 may be deposited on a drum which is rotated by rotating means 14 or may be stationary rather than rotating. Modulator 15 is positioned in the path of light beam 11 between light source means 10 and ferromagnetic medium 12. Modulator 15 may, for example, comprise an electro-optic, acousto-optic, or magneto-optic light beam modulator. Light beam directing means 16, which may comprise, for example electro-optic, acousto-optic or mechanical light beam deflectors, directs light beam 11 to a predetermined region of ferromagnetic medium 12. Focusing lens 17 focuses light beam 11 to a small light spot at memory medium 12.

In operation, light beam directing means 16 directs light beam 11 to a region of ferromagnetic medium 12. Light beam 11 has an intensity sufficient to heat the region above the Curie temperature. Modulator 15 then attenuates light beam 11 to an intensity insufficient to heat the region above the Curie temperature, such that the region cools to a temperature below the Curie temperature. The magnetization direction of the region upon cooling is determined by the net magnetic field present at the location of the region. The net magnetic field may be due solely to the magnetic field of the ferromagnetic material surrounding the region, or it may be due to the magnetic field of the surrounding regions plus an external magnetic field applied by a coil (not shown).

In the present invention, the magnetization direction of the region written is immediately checked to assure that the desired magnetization direction was properly stored in the region. This is achieved by immediately monitoring the magneto-optic rotation caused by the region as the region cools to a temperature at which it has substantially recovered its magnetization. Detector means 20 monitors the magneto-optic rotation caused by the region as it cools immediately after writing and produces a magneto-optic signal which is indicative of the magnetization direction stored in the region or "-bit." As shown in FIG. 1, the Kerr magneto-optic effect is monitored by detector means 20. However, it is to be understood that the Faraday magneto-optic effect, which utilizes light transmitted by ferromagnetic medium 12 rather than light which has been reflected, may be used as well. Reference signal producing means 21 produces a reference signal which represents the magnetization direction which is desired to be stored in the region. The magneto-optic signal produced by the detector means 20 and the reference signal are compared by signal comparing means 22 thereby determining whether the magnetization direction of the region was properly stored.

Assuming that a moving ferromagnetic medium is used, it can be seen that the present invention is technically feasible only so long as the region cools in a very short time compared to the dwell time of light beam 11 over the location of the region. In other words, the region must cool to a temperature at which it has substantially recovered its magnetization before light beam 11 leaves the vicinity of the region. Furthermore, the frequency response of detector means 20 must be fast enough to sense the magnetization direction during this time with an adequate signal-to-noise ratio.

To demonstrate the technical feasibility of the present invention, a system utilizing manganese bismuth film as the ferromagnetic medium will be discussed. However, it is to be understood that the present invention is not restricted to this particular ferromagnetic medium.

Figure 2:
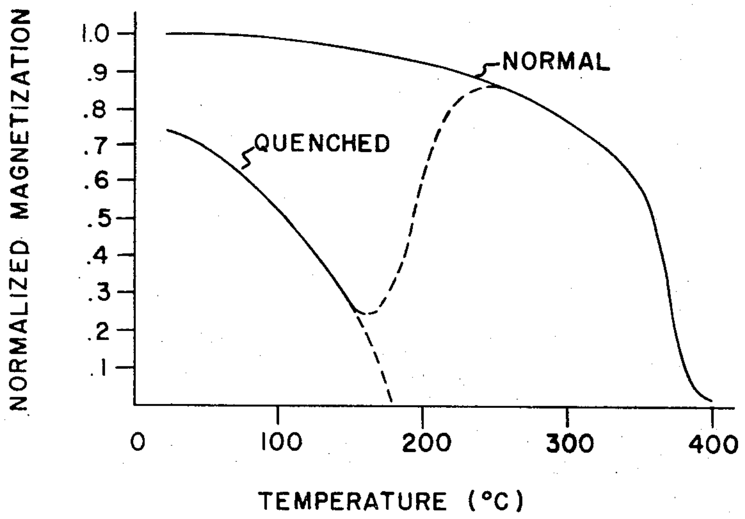
FIG. 2 shows the magnetization of manganese bismuth film as a function of temperature for both the normal and the quenched phases of manganese bismuth.

FIG. 2 shows the normalized magnetization of the normal and quenched crystallographic phases of manganese bismuth film. It can be seen that at a temperature of 100°C the magnetization of the normal phase film is 98 percent of its room temperature value. Similarly, the magnetization of the quenched phase film is 75 percent of its room temperature value. Therefore, whether the region is in the normal phase or the quenched phase, the magnetization of the region is substantially recovered by the time the region cools to a temperature of 100°C.

Figure 3:
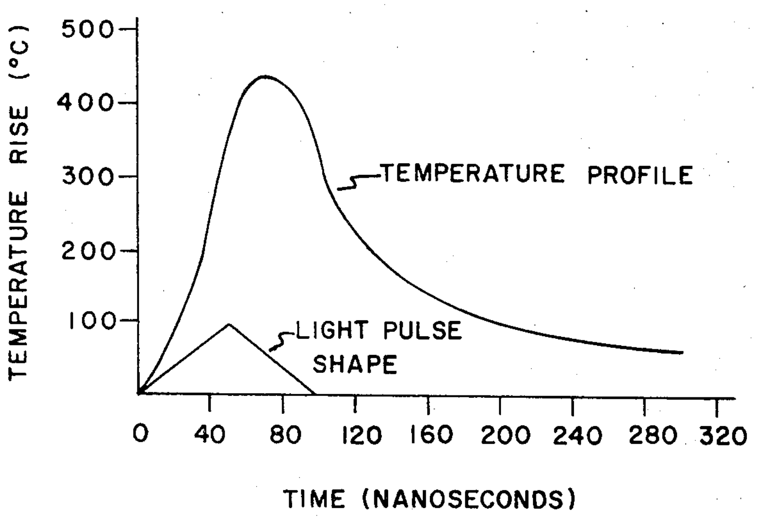
FIG. 3 shows temperature as a function of time for the center of a 1 micron diameter region of manganese bismuth film subjected to a 100 nanosecond laser pulse.

FIG. 3 shows the temperature versus time profile for the center of a 1 micron diameter spot on a backed MnBi film. The term "backed" indicates that the MnBi film was deposited on a substrate such as glass or mica. A substrate of higher thermal conductivity would cause the film to cool even faster. The temperature is taken at the center of the spot which was heated by a laser pulse with a triangular temporal shape and a pulse length of 100 nanoseconds. The laser beam has a Gaussian spatial profile with a $1/e$ radius of 0.872 microns. This results in a micron diameter isotherm at 360°C (the Curie temperature of the normal phase MnBi film) when the peak temperature is at 440°C. As shown in FIG. 3, at 200 nanoseconds after the beginning of the laser pulse, the temperature at the center of the spot is down to 100°C. Therefore, by this time, the magnetization has recovered to 98 percent of the room temperature value when the region or spot is in the normal phase and 75 percent of the room temperature value when it is in the quenched phase.

A moving medium generating $10^6$ bit per second serial data rate from 1 micron bits spaced 3 microns center-to-center must have a linear velocity of 3 microns per microsecond. From FIG. 3 it can be seen that the center of the region is actually written 70 nanoseconds after the beginning of the laser heat pulse. Assuming a linear velocity of 3 microns per microsecond, the center of the region is therefore written 0.2 microns from the beginning of the pulse.

Figure 4:
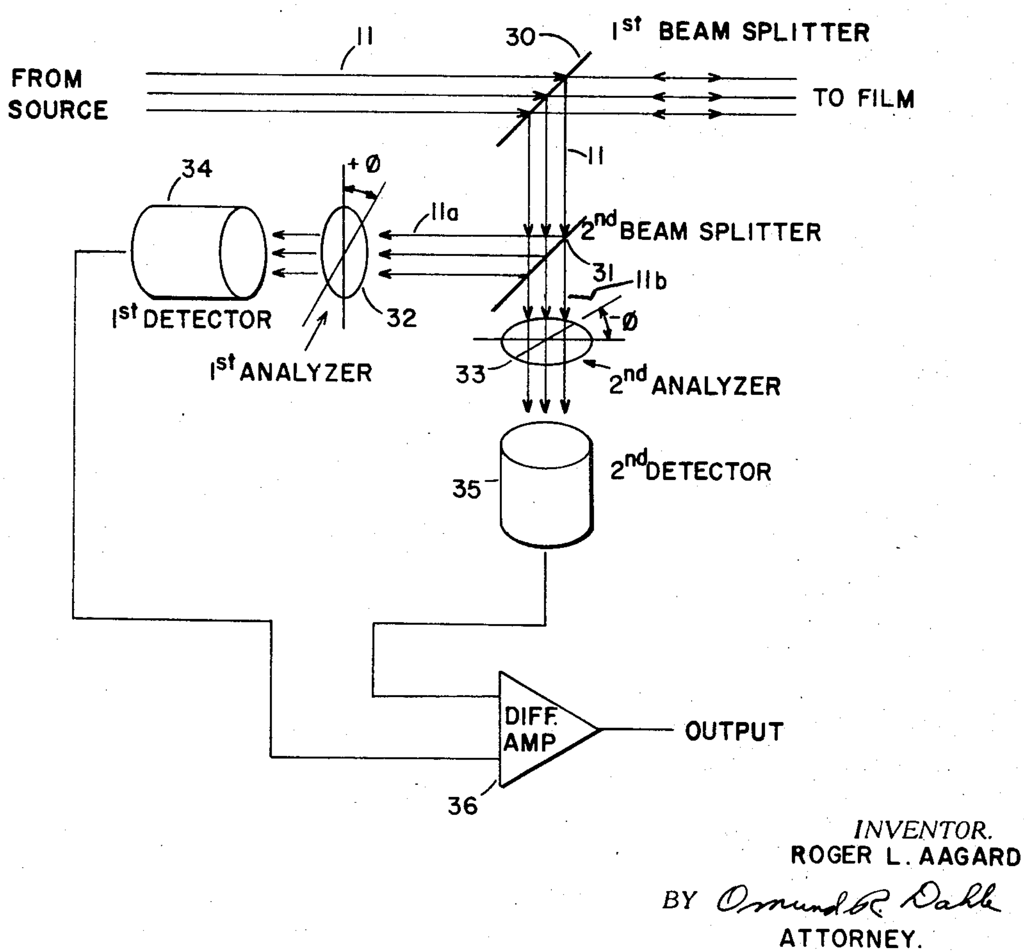
FIG. 4 shows a detector system for use in the optical mass memory of the present invention.

FIG. 4 shows one possible embodiment of detector means 20 which utilizes a differential read out technique. While this particular detector configuration will be used to demonstrate that an acceptable signal-to-noise ratio is achieved, it is to be understood that other detector systems are also applicable to the present invention.

In FIG. 4, first beam splitter 30 directs a portion of reflected light beam 11 to second beam splitter 31. Second beam splitter 31 directs a first portion **11*a* of light beam 11 to first analyzer 32. A second portion 11*b* of light beam 11 is directed to second analyzer 33. Light beams 11*a* and 11*b* pass through first and second analyzers 32 and 33 to first and second detectors 34 and 35, respectively. To obtain a maximum signal-to-noise ratio, first and second detectors 34 and 35 are photomultipliers and first and second analyzers 32 and 33 are each set near extinction. In other words, if $\phi$ is the Kerr rotation angle, then the extinction axis of one analyzer is set at $+\phi$ and the extinction axis of the other analyzer is set at $-\phi$. The output signals from first and second detectors 34 and 35 are directed to differential amplifier 36** which produces an output signal indicative of the difference between the signals from the first and second detectors.

If the detection system shown in FIG. 4 is allowed to have a 30 mHz bandwidth, a significant signal-to-noise ratio must result in order that the present invention be operable. The signal-to-noise ratio (S/N) can be expressed as $$S/N=\frac{I_0 S \sin^2 2\phi K(^{a}/\omega_0)}{\sqrt{2}\,[2eI_0 S \sin^2 2\phi + {}^{4kT}/R + {}^{1}/B\,({}^{V}a/_R)^2]^{1/2} B^{1/2}}$$

where $S=0.05\times10^6\ \mu A/\mu\omega$ = Detector responsivity
$R=5\times10^3\ \Omega$ = Load resistance
$C_D$ = 10pf = Detector capacitance
$V_a=50\mu v$ = Amplifier noise
$K(^{a}/\omega_o)=0.2$ = Portion of the beam intercepting the bit
$I_o$ = 1mw = Read beam intensity
$B$ = 30 mHz = Detection bandwidth
$2\phi=4°$ = Kerr rotation.

Substituting these numbers yields $$S/N=\frac{4\times10^{-6}}{1.4[3.2\times10^{-24}+2\times10^{-23}+1\times10^{-24}]^{1/2}5.5\times10^{3}}\simeq 250.$$

One potential problem of the optical memory of the present invention is that detector means 20 receives the write pulse of light beam 11 after it is reflected by ferromagnetic medium 12. If the intensity of light beam 11 during writing is too intense, detector means 20 may be saturated, thereby precluding recovery of detector means 20 in time to reliably sense the magnetization direction of the region or bit. However, in a moving media system, this presents little difficulty since the read beam is only on a bit location for a short period of time each revolution (approximately 1 microsecond). Therefore, the extinction ratio of modulator 15 need not be especially large. The extinction ratio is defined as the ratio of the intensity of the beam during writing to the intensity of the beam during reading. If the extinction ratio is 10:1 or less, detector means 20 should not become saturated, since the dynamic range of most detectors is certainly greater than a factor of 10. Therefore, detector means 20 will not be saturated by the write pulse of light beam 11.

A wide variety of coding schemes utilizing the method of the present invention are envisioned. One particularly advantageous coding scheme involves using a plurality of bits to denote a word. By way of example, each word might contain 9 bits. The first 8 bits denote the information desired to be stored, while the ninth bit indicates whether a word has been correctly stored. For example, if each of the previous 8 bits were correctly stored, the ninth bit has a first magnetization direction. On the other hand, if any one of the 8 bits is not properly stored, the ninth bit will be written to have the second magnetization direction. This coding scheme is possible with the present invention because each bit is checked immediately after it is written to determine whether it is stored properly. Any failure to store a word perfectly causes the same word to again be stored. If again one or more of the bits are improperly stored, the ninth bit will again be written to have the second magnetization direction. The same word will continue to be stored until the storage is perfect. At that time the ninth bit will be written to have the first magnetization direction. The system is biased so that a failure to write a bit of first magnetization is registered as a bit of second magnetization. Thus, the error detection bit must record as a bit of first magnetization also in order that the word be accepted as correctly stored.

During the subsequent read operation only those words having a ninth bit which has a first magnetization direction will be read out of the memory. Therefore, only perfectly stored words will be utilized in the storage of information.

While this invention has been particularly shown and described with reference to the preferred embodiments thereof, it will be understood by those skilled in the art that changes in form and detail may be made therein without departing from the scope and spirit of the invention.

The embodiments of the invention in which an exclusive property or right is claimed are defined as follows:

1. A method of storing information on a ferromagnetic medium by writing a bit of information and then checking the bit to ensure that the bit was correctly written, the method comprising:

heating a region of the ferromagnetic medium to a temperature above the Curie temperature with a light beam, attenuating the light beam to an intensity insuficient to heat the region above the Curie temperature, such that region cools to a temperature below the Curie temperature and has a magnetization direction determined by a net magnetic field present at the location of the region, immediately monitoring the magneto-optic rotation caused by the region to produce a magneto-optic signal indicative of the magnetization direction of the region as the region cools to a temperature at which it has substantially recovered its magnetization, the monitoring occurring before another region is heated, producing a reference signal representing the magnetization direction desired to be stored in the region, and comparing the reference signal and the magneto-optic signal to determine whether the desired magnetization direction was properly stored in the region.

2. The method of claim 1 wherein the light beam heats a plurality of regions of the ferromagnetic medium and further comprising:

storing information in an additional region, the additional region having a first magnetization direction if the magnetization direction of each region of the plurality is properly stored and a second magnetization direction if the magnetization direction of any one of the plurality of regions is not properly stored.

3. The method of claim 1 wherein the ferromagnetic medium is manganese bismuth film.

4. An optical memory in which information is stored by writing a bit of information and then checking the bit to ensure that the bit was correctly written, the optical memory comprising:

a ferromagnetic medium, a light source means for producing a light beam having an intensity sufficient to heat a region of the ferromagnetic medium to a temperature above the Curie temperature, light beam directing means for directing the light beam to a predetermined region of the ferromagnetic medium, modulator means for selectively transmitting the light beam with an intensity sufficient to heat a region of the ferromagnetic medium to a temperature above the Curie temperature, and then attenuating the light beam to an intensity insufficient to heat the region to a temperature above the Curie temperature, such that the region cools to a temperature below the Curie temperature and has a magnetization direction determined by a net magnetic field present at the location of the region, detector means for immediately monitoring, before another region is heated, the magneto-optic rotation caused by the region as the region cools to a temperature at which it has substantially recovered its magnetization, and for producing a magneto-optic signal indicative of the magnetization direction of the region, reference signal producing means for producing a reference signal representing the magnetization direction desired to be stored in the region, and signal comparing means for comparing the reference signal and the magneto-optic signal to determine whether the magnetization direction of the region was properly stored.

5. The optical memory of claim 4 wherein the ferromagnetic medium is manganese bismuth film.

6. The optical memory of claim 4 and further comprising rotating means for rotating the ferromagnetic medium.

* * * * *